Figure 1:
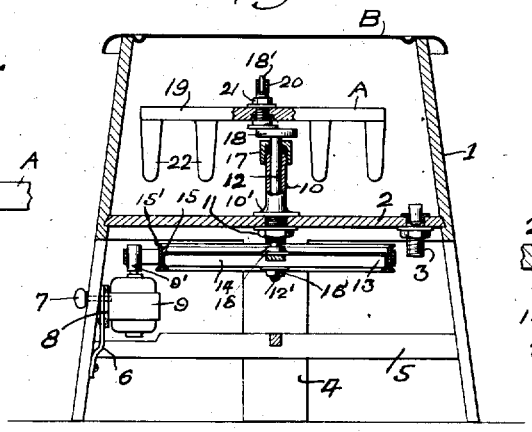

Oct. 4, 1927. B. P. CHURCHILL ET AL Re. 16,758

WASHING MACHINE

Original Filed Dec. 8, 1921

INVENTOR.
BENN P. CHURCHILL
BY WILLIAM J. CHURCHILL
Erwin, Wheeler & Woodard
ATTORNEYS.

Reissued Oct. 4, 1927.

Re. 16,758

UNITED STATES PATENT OFFICE.

PENN P. CHURCHILL AND WILLIAM J. CHURCHILL, OF MILWAUKEE, WISCONSIN.

WASHING MACHINE.

Original No. 1,447,760, dated March 6, 1923, Serial No. 520,798, filed December 8, 1921. Application for reissue filed February 9, 1925. Serial No. 8,010.

The primary object of our invention is to provide a compact, simple, durable and efficient washing machine, the construction and arrangement of which is such that it can be manufactured at a normal cost and thereby disposed of to the trade in large quantities, meeting a condition wherein it is possible for people in moderate circumstances to afford a mechanical washer.

Other objects of our invention are to provide a compact washing machine wherein all of the working parts are concealed and protected without the use of special guards etc., whereby the machine, as a whole, will present a neat appearance and is not liable to cause injury to persons working about it.

To provide a machine wherein the lid or cover carries no working parts, whereby it can be utilized as a table or other piece of furniture in connection with the tub when not in use.

To provide a power driven spindle for the working parts of the machine, which spindle extends through the bottom of the tub for the reception of the washing units.

To provide a washing unit which is detachable from its driving spindle whereby the said unit can be interchanged for a wringing unit.

To provide an eccentric connection between the driving spindle and washing and wringing units, whereby the peculiar action imparted to the same will produce efficient results.

To provide a machine having standard fittings in connection with its spindle, whereby leakage is avoided.

To provide a simple driving mechanism for the spindle, the same being in the form of an inexpensive belt and pulley in direct connection with a motor.

To provide an assemblage of driving mechanism between the legs of the tub, whereby the same constitutes protecting shields for said driving mechanism.

To provide a simple skeleton agitator adapted to be coupled to the drive spindle, the agitator having depending fingers which impart a series of gyrating washing and scrubbing movements to the clothing, whereby the same is gently cleansed without liability of damage by rough usage, usually resulting in laundry work subjected to power driven machines.

To provide a centrifugal wringer basket having a coupling connection which can be readily fitted to the crank spindle, whereby a rotatory motion is imparted to the basket for extracting the water from the clothing by centrifugal action.

To provide an agitator composed of wood, having fingers mounted upon radial arms, the spokes of the agitator being locked together by a metallic bushing mechanism forming a hub connection for the reception of the cranked end of the driving spindle.

To provide companion indicator marks in connection with the crank spindle and hub of the centrifugal wringer basket, whereby the basket can readily be coupled to the spindle in its correct clutched position.

With the above and other objects in view, our invention consists in certain peculiarities of construction and combination of parts as are hereinafter set forth and subsequently claimed.

In the drawings,

Figure 1 represents a sectional elevation of a washing machine embodying the features of our invention.

Figure 2:
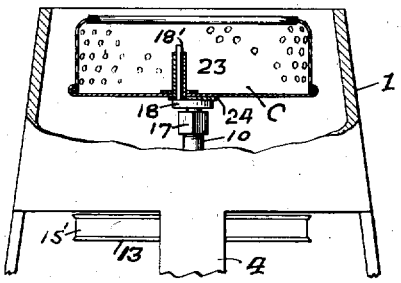

Figure 2, a fragmentary view of the same, partly in section, showing a centrifugal wringer basket attachment in connection with the driving spindle.

Figure 3:
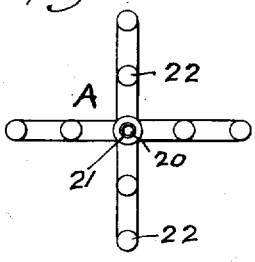

Figure 3, a plan view of a skeleton agitator.

Figure 4:
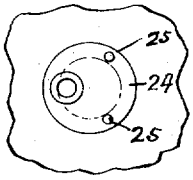

Figure 4, a fragmentary bottom plan view of the wringer basket bearing.

Figure 5:
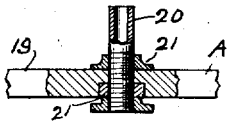

Figure 5, an enlarged detailed view, partly in section, of the agitator hub.

Figure 6:
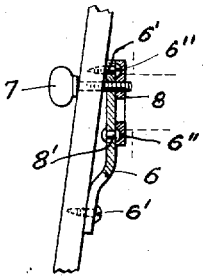

Figure 6, an enlarged detailed sectional elevation showing means for attaching a motor to the leg of the tub.

Figure 7:
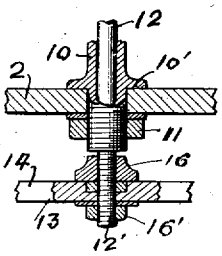
Figure 8:
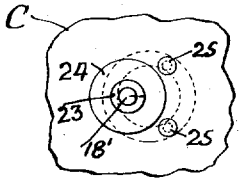

Figure 7, an enlarged detailed sectional view of the driving spindle pulley hub and related parts, and Figure 8, an enlarged detailed top plan view showing the coupling connection between the wringer basket hub and spindle.

Referring by characters to the drawings, 1 represents a standard tub, the bottom 2 of which is provided with a drain nipple 3, the same being normally closed by a stopper preferably of the cork type. The tub is provided with standard legs 4 connected by suitable cross braces 5, the said legs by their arrangement defining an interior space or circle within which the driving motor and all of the connected operating parts are disposed, so that none of such operating elements project beyond the circumferential plane of the machine, and consequently are thus enclosed and protected from injury by contact with extraneous objects. One of the legs has fixed to its inner surface, a strap 6 by means of screws 6′. Passing through an aperture of the strap is a thumb screw 7, which thumb screw is in threaded union with an aperture in a base ring 8 of an electric motor 9. The base ring of the motor is also formed with apertures 6″, one of which apertures is fitted over a retaining screw 6′ and the other aperture over a lug 8′, which extends from the juxtaposed face of the strap 6. The motor 9 is thus rigidly but detachably secured to the leg of the tub by a single thumb screw 7. Hence, the assemblage can readily be effected and a standard motor can be utilized having its shaft provided with a vertically disposed pulley 9′ for direct drive connections.

It is understood that the bottom and side walls of the tub may be corrugated in any suitable manner to facilitate washing, the corrugations being not shown as they form no part of my invention.

The center of the tub bottom is apertured for the reception of the screw threaded end of a tubular bearing or housing 10, the said bearing being provided with a shoulder 10′ that is fitted snugly against the upper surface of the tub bottom. The bearing 10 is firmly fitted in its vertical position and the joint between it and the bottom is sealed by a binding nut 11, which nut is in threaded union with the end of said tubular bearing. The tubular bearing or housing 10 is provided for the reception of a spindle 12, the lower end of which extends therethrough for the reception of a spoke driving pulley 13. The driving pulley 13 is, for cheapness in construction, built up from wood spokes 14 having a metallic band or felly 15 secured to their outer ends, which band, in turn, has soldered thereon a belt receiving metallic ring 15′. Hence the belt receiving ring is reinforced and the pulley, as a whole, is cheaply constructed and light.

The spokes 14 of the pulley are in mitered connection at their central intersection, at which point they are apertured for the reception of the threaded end 12′ of the spindle 12. The spokes and pulley, as a whole, are held in rotative relation with the spindle by upper and lower clamping nuts 16—16′ respectively, there being suitable washers interposed between the upper clamping nut and the lower end of the associated tubular bearing 10 to limit longitudinal play of the spindle.

The upper end of the spindle 12 projects through the tubular bearing 10, and in order to effect a water tight joint at this point, a suitable stuffing box 17 is provided, the same being in threaded union with the end of the tubular bearing. The power driven spindle 12 has rigidly secured thereto, at its upper end, a disk 18 from which extends a crank pin 18′, as shown in Figure 1. When the machine is equipped for washing, the crank pin 18′ has loosely mounted thereon, a skeleton agitator A. The agitator is constructed from cross connected wood spokes 19, which spokes are centrally apertured for the reception of the screw threaded end of a thimble 20, the said thimble being clamped to the spokes by upper and lower nuts 21, whereby the spokes of the agitator are secured together and a metallic hub is formed, which hub is, as shown, detachably mounted upon the crank pin 18′, to thereby produce a metal to metal contact between the drive and driven elements, it being understood that the lower clamping nut 21 also forms a thrust bearing.

Prior to placing the machine in operation, the tub is partly filled with the washing liquid and the clothing nested about the bearing 10. Thereafter the agitator is dropped into position, as shown in Figure 1, and a series of rounded fingers 22, depending from the spokes of the agitator, will engage and gently press upon the clothing at various points. Hence the agitator is capable of horizontal play or what might be termed, a floating action with relation to its wrist pin connection 18′.

When motion is imparted to the spindle 12, through the belt drive connection to the motor, the agitator will describe a wabble action, due to the eccentric driving connection with the spindle, whereby the agitator has a planetary movement of rotation about its axis. Hence the fingers 22 will describe a series of independent rotary gyrations, imparting thereto a multiple series of scrubbing actions upon the surface of the clothing, giving thereto a massaging gentle movement, while at the same time, the continued action imparted to the agitator, as a whole, will cause it to move in a rotatory direction whereby the clothing will be constantly shifted with relation to its position in the tub.

After the clothing has been thoroughly washed and rinsed by the action of the scrubbing agitator, the agitator A is removed, and the washed fabrics are withdrawn from the tub. A wringing or drying basket C is then substituted in the machine for the agitator and the wet fabrics placed therein for subjection to a drying operation. This basket is preferably constructed from a metallic disk constituting the bottom thereof, having side walls of perforated material, the upper edges or mouth portion of which are contracted inwardly, to prevent the clothing nested therein from being discharged, by centrifugal action imparted to the basket. The solid bottom of the basket has a metallic hub 23 extending upwardly therefrom, which hub is eccentric with relation to the center of the basket. The lower face of the basket bottom has secured thereto a plate 24, which plate has extending therefrom a pair of coupling pins 25 that are arranged equidistant from the hub aperture. Hence when it is desired to fit the basket to the driving spindle of the tub, the operator adjusts the hub 23 of the basket to the crank pin 18′, and in so doing, the basket is rotated about the pin in such position that an indicator mark upon the end of the crank pin 18′ will register with a corresponding indicator mark upon the end plate of the hub 23. When this registration is effected, the pins 25 are positioned to straddle the wrist pin disk 18, whereby the basket is locked against rotation upon the crank pin 18′, and is centered axially with respect to the spindle 12. Inasmuch as the horizontal plane in which the upstanding extractor C rotates is above that in which the depending agitator or dolly A rotates, it is not necessary to empty the water after washing and before drying the fabrics, but the water in the tub may be used in a succeeding operation, if serviceable.

After the clothing, which has been previously washed, is dropped into the basket, motion being imparted thereto will cause said basket to revolve at a high speed through its direct connection to the spindle and in its rotations, the basket will develop a centrifugal force, whereby the clothing is caused to shift outwardly against the walls of said basket. This action of the clothing will effectually extract all water therefrom. The dried clothes can then be removed and ironed if desired.

Attention is also directed to the fact that the cover B of the tub is formed from a single piece of metal, having a downturned annular lip 26 and a circular bead 26′, which bead effects a nested seat with relation to the inner edge of the tub mouth, whereby a comparatively tight joint is effected and the downturned lip 26 serves as a protection and it also presents a sightly appearance, whereby it will present a neat appearance when not in use. The removable metallic top can thus be used for a seat, table or other purposes incidental to household conveniences.

While we have shown and described a simple exemplification of our invention minutely as to detail, it is understood that we may vary the details of construction, within the scope of the claims, as it may be hereafter interpreted by the skilled mechanic.

What we claim and desire to secure by Letters Patent of the United States, is:

1. A washing machine comprising a leg supported tub, a tubular bearing extending upwardly through the bottom of the tub, a spindle mounted in the tubular bearing, a drive mechanism for the spindle, the same being positioned under the tub bottom and located within the leg portions thereof, whereby the driving mechanism is protected, a crank pin extending upwardly from the spindle, and an agitator detachably mounted upon the crank pin, the agitator including a series of depending fingers.

2. A washing machine comprising a tub with its supporting legs, a tubular bearing vertically mounted in the tub, a rotating spindle supported for rotation in the said bearing, driving means for the said spindle located at the underside of the tub, a demountable agitator upon the upper end of the spindle, and an eccentric connection between the spindle and the said agitator whereby a planetary movement is imparted to the latter.

3. A washing machine comprising a tub and supports therefor, a tubular bearing passing through and secured to the bottom of the tub, a spindle supported by and mounted for rotation in the said bearing, a motor disposed at the underside of the tub, connections between the said motor and the spindle whereby the latter is rotated, the said motor and connections being arranged wholly within the circumferential plane of the machine for protection, a disc secured to the upper end of the spindle, a crank pin extending from the disc, and a demountable element supported upon the said disc and positioned by the crank pin with respect to the spindle.

In testimony whereof, we have signed our names at Milwaukee, this 28th day of January, 1925.

BENN P. CHURCHILL.
WILLIAM J. CHURCHILL.